(12) United States Patent
Cheng et al.

(10) Patent No.: US 11,778,317 B2
(45) Date of Patent: Oct. 3, 2023

(54) METHOD FOR MACRO PHOTOGRAPHY, ELECTRONIC DEVICE AND STORAGE MEDIUM

(71) Applicant: BEIJING XIAOMI MOBILE SOFTWARE CO., LTD., Beijing (CN)

(72) Inventors: Chihyi Cheng, Beijing (CN); Liangming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 89 days.

(21) Appl. No.: 17/682,794

(22) Filed: Feb. 28, 2022

(65) Prior Publication Data

US 2023/0055118 A1 Feb. 23, 2023

(30) Foreign Application Priority Data

Aug. 20, 2021 (CN) .......................... 202110962111.0

(51) Int. Cl.
*H04N 23/667* (2023.01)
*H04N 23/80* (2023.01)
*H04N 23/67* (2023.01)
*H04N 23/90* (2023.01)

(52) U.S. Cl.
CPC .......... *H04N 23/667* (2023.01); *H04N 23/67* (2023.01); *H04N 23/80* (2023.01); *H04N 23/90* (2023.01)

(58) Field of Classification Search
CPC ...... H04N 23/667; H04N 23/67; H04N 23/80; H04N 23/90; H04N 23/69; G06F 16/9538; G06F 16/951; G06Q 10/083; Y10S 707/99931; Y10S 707/99933; Y10S 707/99934; Y10S 707/99935; Y10S 707/99936; Y10S 707/99937
See application file for complete search history.

(56) References Cited

U.S. PATENT DOCUMENTS

| | | | |
|---|---|---|---|
| 2017/0153459 A1* | 6/2017 | Chang | H04N 23/60 |
| 2020/0128161 A1* | 4/2020 | Kroekel | H04N 25/531 |
| 2020/0134848 A1* | 4/2020 | El-Khamy | H04N 23/45 |
| 2020/0326754 A1* | 10/2020 | Kim | G09F 9/301 |
| 2021/0063687 A1* | 3/2021 | Huh | G02B 5/003 |
| 2021/0075969 A1* | 3/2021 | Liu | H04N 23/58 |
| 2021/0099626 A1* | 4/2021 | Kwon | H04N 23/54 |
| 2021/0112206 A1* | 4/2021 | Hwang | G06F 3/0485 |
| 2021/0368104 A1* | 11/2021 | Bian | H04N 23/698 |
| 2022/0132021 A1* | 4/2022 | Kim | H04N 23/67 |
| 2022/0155418 A1* | 5/2022 | Han | H04N 23/52 |
| 2022/0165765 A1* | 5/2022 | Jung | H01L 27/14605 |

(Continued)

*Primary Examiner* — Lin Ye
*Assistant Examiner* — Tuan H Le
(74) *Attorney, Agent, or Firm* — COZEN O'CONNOR

(57) ABSTRACT

A method for macro photography includes acquiring a first image captured by a first camera and a second image captured by a second camera; and controlling a third camera to perform macro photography in response to no overlapping region between the first image and the second image. Further, the third camera at least has a macro photography function, there is an overlapping field between fields of view of the first camera and the second camera in response to photography distances of the first camera and the second camera being greater than or equal to a first photography distance, and the first photography distance is less than or equal to a macro photography distance set in the third camera.

20 Claims, 4 Drawing Sheets

(56) References Cited

U.S. PATENT DOCUMENTS

| | | | |
|---|---|---|---|
| 2022/0286662 A1* | 9/2022 | Yang | G02B 1/002 |
| 2022/0385831 A1* | 12/2022 | Shabtay | G03B 13/02 |
| 2023/0156301 A1* | 5/2023 | Feng | H04N 23/67 |
| | | | 348/262 |
| 2023/0224575 A1* | 7/2023 | Ding | H04N 23/635 |
| | | | 348/333.03 |

* cited by examiner

METHOD FOR MACRO PHOTOGRAPHY, ELECTRONIC DEVICE AND STORAGE MEDIUM

CROSS-REFERENCE TO RELATED APPLICATION

This application is based upon and claims priority to Chinese Patent Application No. 202110962111.0, filed on Aug. 20, 2021, the entire content of which is incorporated herein by reference.

TECHNICAL FIELD

The disclosure relates to the field of image collection technologies, and more particularly to a method for macro photography, an electronic device and a storage medium.

BACKGROUND

Macro photography may is a technique for amplifying small details of a photographed object to make it look life-size or larger. It can photograph an object in a close-up scene and render small objects with a large amount of detail that may not be visible with the naked eye. Interest in macro photography is increasing and cameras designed to perform macro photography are increasingly being incorporated in a variety of electronic devices.

SUMMARY

According to a first aspect of embodiments of the disclosure, a method for macro photography is provided, and includes: acquiring a first image captured by a first camera and a second image captured by a second camera; and controlling a third camera to perform macro photography in response to no overlapping region between the first image and the second image; in which the third camera at least has a macro photography function, there is an overlapping field between fields of view of the first camera and the second camera in response to photography distances of the first camera and the second camera being greater than or equal to a first photography distance, and the first photography distance is less than or equal to a macro photography distance set in the third camera.

According to a second aspect of embodiments of the disclosure, an electronic device is provided, and includes: a memory, a processor and a computer program stored on the memory and for running on the processor, in which the processor is configured to perform the method as described in the first aspect when performing the program.

According to a third aspect of embodiments of the disclosure, a non-transitory computer-readable storage medium stored with a computer program thereon is provided, in which the method as described in the first aspect is performed when the computer program is performed by a processor.

Additional aspects and advantages of the disclosure will be set forth in part in the following description, and in part will become obvious from the following description, or may be learned by practice of the disclosure.

BRIEF DESCRIPTION OF THE DRAWINGS

The above and/or additional aspects and advantages of the disclosure will become apparent and more readily from the following descriptions made with reference to the drawings, in which.

DETAILED DESCRIPTION

Descriptions will now be made in detail to exemplary embodiments, examples of which are illustrated in the accompanying drawings, in which the same or similar signs represent the same or similar elements or elements with the same or similar functions throughout the descriptions. The embodiments described below with reference to the drawings are exemplary, are intended to explain the disclosure and are not to be construed as a limitation of the disclosure.

A method and an apparatus for macro photography, an electronic device and a storage medium in embodiments of the disclosure are described with reference to the accompanying drawings.

Figure 1:
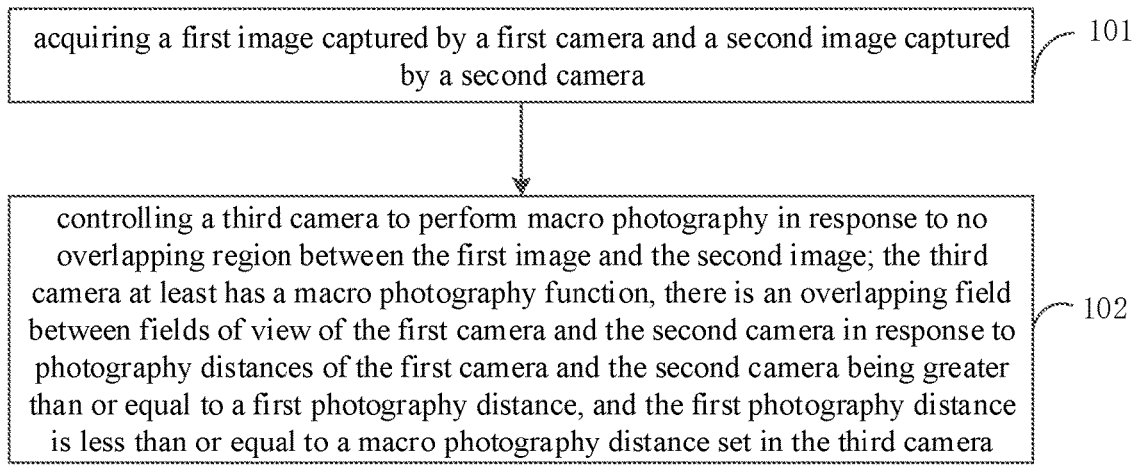
FIG. 1 is a flowchart illustrating a method for macro photography according to some embodiments of the disclosure.

FIG. 1 is a flowchart illustrating a method for macro photography according to some embodiments of the disclosure.

As illustrated in FIG. 1, the method may include the following.

At 101, a first image captured by a first camera and a second image captured by a second camera are acquired.

The executive subject of embodiments of the disclosure is an apparatus for macro photography. The apparatus is arranged in an electronic device. The electronic device may be a mobile phone, a pocket computer or the like, which is not limited in embodiments.

According to some embodiments of the disclosure, the electronic device may be provided with at least three cameras, which are referred to as the first camera, the second camera and the third camera. The third camera at least has a macro photography function.

In an implementation of embodiments of the disclosure, the first camera and the second camera may be monitored, the first image captured by the first camera and the second image captured by the second camera are acquired, and it is determined, by the first image and the second image, whether to enter a macro photography mode, so as to perform macro photography by the third camera with the macro photography function.

In another implementation of embodiments of the disclosure, the first camera and the second camera are launched in response to launching the third camera, and the first image captured by the first camera and the second image captured by the second camera are acquired. In some embodiments, when the third camera is launched, it may perform macro photography on a photographed object, for example, a person, a landscape, a small animal or a tiny object. Therefore, it may be determined rapidly whether to enable the macro photography mode of the third camera to perform macro photography through the first image and the second image. As an implementation, it may be determined whether the photographed object of the third camera is in a photography blind region of the first camera and the second camera, so as to determine whether to enable the macro photography mode of the third camera.

In a scene of embodiments of the disclosure, the third camera may be a fixed-focus macro camera, to rapidly recognize whether to enable the macro photography function, that is, to rapidly enable the macro photography function, and further to ensure the accuracy of photographing by the third camera the current photographed object.

In another scene of embodiments of the disclosure, the third camera may be provided with at least two photography focusing segments, any of the at least two photography focusing segments may correspond to the macro photography mode, and a photography scene or a photography mode corresponding to the other photography focusing segment is not limited in embodiments. That is, the third camera may be a long-focus camera, a wide-angle camera, an ultra-wide-angle camera or the like, having the macro photography mode. It may be rapidly determined whether the third camera performs macro photography by the focusing segment for macro photography, which may shorten the focus duration photographed by the third camera, and increase the focus precision of macro photography.

It should be noted that, when the third camera has an automatic focus function, for example, the third camera may be the long-focus camera, fields of view (FOVs), that is, angle of view ranges of lens or field of view ranges covered by lens, of the first camera and the second camera, may be greater than the FOV of the third camera; and when the third camera is the long-focus camera, the speeds of focusing to a close shot by the first camera and the second camera may be greater than the speed of focusing to the close shot by the third camera, thereby improving the macro photography speed of the third camera. When the third camera is the fixed-focus macro camera, the FOV of the third camera and the FOV of the first camera or the second camera are not limited.

In an implementation of embodiments of the disclosure, the first camera may be a wide-angle camera or an ultra-wide-angle camera, the second camera may also be a wide-angle camera or an ultra-wide-angle camera, and the third camera may be a long-focus camera. The long-focus camera may perform macro photography in the macro photography mode. When the first camera and the second camera are wide-angle cameras, the angle of view ranges of the first camera and the second camera, that is, the fields of view, may be the same or different. For example, the field of view of the first camera is less than the field of view of the second camera, such as, the first camera may be a wide-angle camera and the second camera may be an ultra-wide-angle camera; or the field of view of the first wide-angle camera is greater than the field of view of the second camera, such as, the first camera may be an ultra-wide-angle camera and the second camera may be a wide-angle camera; or, both the first camera and the second camera are wide-angle cameras with the same field of view.

The macro photography refers to photography with an image ratio of 1:1 or greater (generally around 1:1 to 1:4) through the camera. The macro photography function means that the third camera has the ability to perform the macro photography within the set macro photography distance. The macro photography mode refers to a photography mode in which the third camera with the macro photography function is used to photograph a subject whose distance from the third camera is within the macro photography distance.

At 102, a third camera is controlled to perform macro photography in response to no overlapping region between the first image and the second image.

According to some embodiments of the disclosure, the first image captured by the first camera and the second image captured by the second camera are acquired, and it is recognized whether there is an overlapping region in the two images by comparing the first image and the second image, to recognize whether there is an blind region of view, that is, a blind region in the field of view, between the first camera and the second camera under the current photography distance, so as to determine whether the photographed object is located in the macro photography range, to determine whether to control the third camera to perform macro photography.

Figure 2:
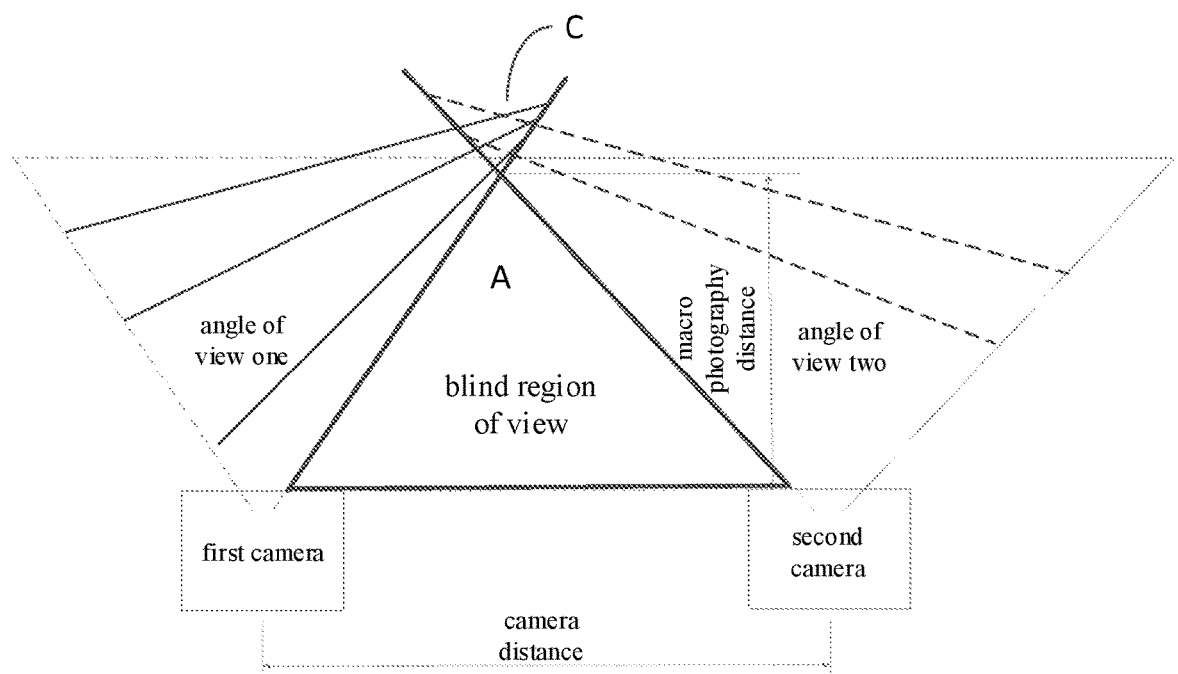
FIG. 2 is a diagram illustrating a camera blind region of view according to some embodiments of the disclosure.

FIG. 2 is a diagram illustrating a camera blind region of view according to some embodiments of the disclosure. The black triangle region corresponding to region A in FIG. 2 is a blind region of view of the first camera and the second camera. When there is the blind region of view in region A between the first camera and the second camera under the current photography distance, the third camera is controlled to perform macro photography.

According to some embodiments of the disclosure, the third camera, the first camera and the second camera are arranged on the same side of the electronic device, for example, all on the rear side of the electronic device or all on the front side of the electronic device. The specific position relationship between the third camera and the first camera and the second camera on the same side of the electronic device may be adjusted based on the design requirements and stacking requirements of the device. For example, the third camera may be located on one side of any of the first camera and the second camera, such as, the third camera may be located on a plus side of one of the first camera and the second camera, or the third camera may be located on an oblique side of one of the first camera and the second camera; for example, the third camera may be located between the first camera and the second camera, such as, the third camera may be located in the middle of the first camera and the second camera, or the third camera may be located between the first camera and the second camera and biased toward one of the first camera and the second camera, or the third camera may be located between the first camera and the second camera, and the optical axis of the third camera deviates from the plane formed by the optical axes of the first camera and the second camera; and for example, the optical axes of the third camera, the first camera and the second camera may be located on the same plane.

Figure 3:
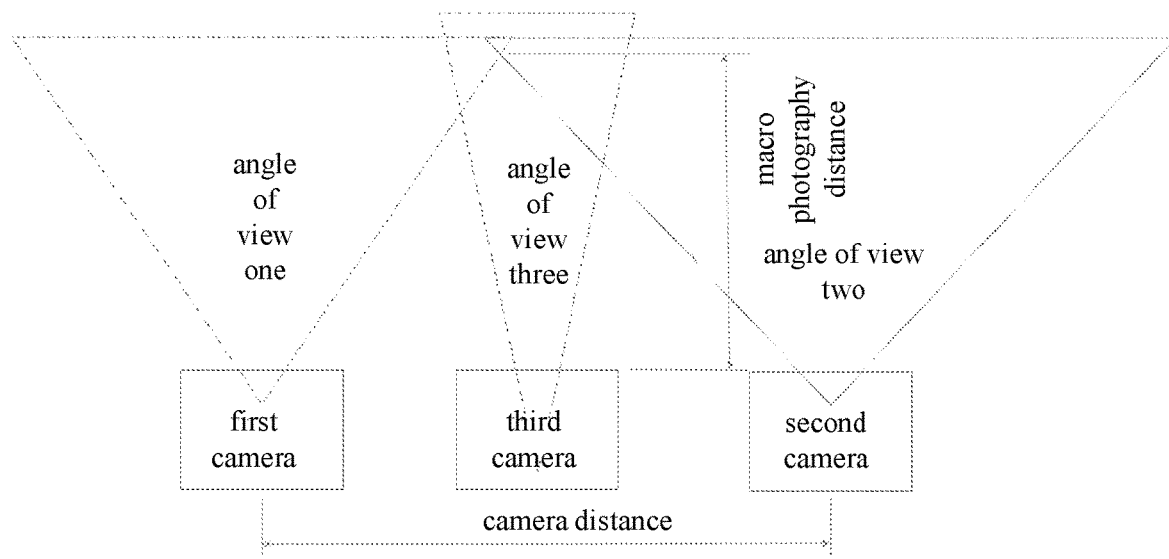
FIG. 3 is a diagram illustrating setting of each camera for macro photography according to some embodiments of the disclosure.

For example, as illustrated in FIG. 3, the third camera may be located between the first camera and the second camera. In the example, when the photographed object that needs to be photographed by the third camera is in the blind region of view of the first camera and the second camera, it is indicated that the first camera and the second camera may not collect a complete image of the photographed object, that is, the photographed object is within the macro photography distance of the third camera, and the macro photography mode needs to be enabled to control the third camera to perform macro photography. For example, in a scene, it is indicated that the photographed object is not in the blind region of view of the first camera and the second camera in response to an overlapping region between the first image and the second image, and it is not necessary to switch the third camera to the macro photography mode.

In another scene, the photographed object in the first image and in the second image is discontinuous in response to no overlapping region between the first image and the second image. It is indicated that the photographed object is in the blind region of view of the first camera and the second camera, that is, the distance between the photographed object and the plane where the third camera is located (that is, the photography distance) is less than or equal to the macro photography distance. It may be automatically switched to the macro photography model of the third camera to control the third camera to perform macro photography, which determines that the photographed object is in the blind region of view of the first camera and the second camera by comparing the overlapping relationships of the first image and the second image. The third camera is controlled to automatically perform macro photography in response to determining that the photographed object is in the blind region of view, which enhances automatic recognition of macro photography, rapidly determines whether to perform macro photography, and improves the macro photography efficiency by the third camera.

According to some embodiments of the disclosure, the third camera has a set macro photography distance. The maximum distance between the photographed object and the first camera or the second camera is determined in response to determining that the photographed object is in the blind region of view of the first camera and the second camera, that is, the blind region of the field of view range. There may be a region that may not be focused when macro photography is performed by the third camera in response to the maximum distance being greater than the macro photography distance set in the third camera, resulting in unable to acquire a clear image. Therefore, in some optional embodiments, in order to enhance the macro photography effect, there is an overlapping field between fields of view of the first camera and the second camera in response to photography distances of the first camera and the second camera being greater than or equal to the first photography distance, that is, a distance between the photographed object and the first camera or the second camera being greater than or equal to the first photography distance, in which the first photography distance is less than or equal to the macro photography distance set in the third camera, which improves the macro photography efficiency by the third camera.

The photography distance of the first camera is a distance between the photographed object and a plane located by the first camera. Similarly, the photography distance of the second camera is a distance between the photographed object and a plane located by the second camera. The first photography distance is a threshold that is preset for determining whether there is the overlapping field between fields of view of the first camera and the second camera based on the photography distances of the first camera and the second camera.

For example, in some possible embodiments, the blind region of view between the first camera and the second camera may be adjusted based on the use requirements of the device, for example, the blind region of view between the first camera and the second camera may be adjusted by adjusting one or more of: a distance between the first camera and the second camera, an angle of view of the first camera or the second camera, and the macro photography distance set in the third camera.

In the method for macro photography according to some embodiments of the disclosure, the first image captured by the first camera and the second image captured by the second camera are acquired; and the third camera is controlled to perform macro photography in response to no overlapping region between the first image and the second image; in which there is the overlapping field between fields of view of the first camera and the second camera in response to photography distances of the first camera and the second camera being greater than or equal to the first photography distance, and the first photography distance is less than or equal to the macro photography distance set in the third camera. In embodiments of the disclosure, when no overlapping region between the first image and the second image is recognized, it is determined that the photographed object is in the blind region of view between the first camera and the second camera. In this case, the macro photography mode of the third camera is automatically enabled, to improve the macro photography efficiency.

Figure 4:
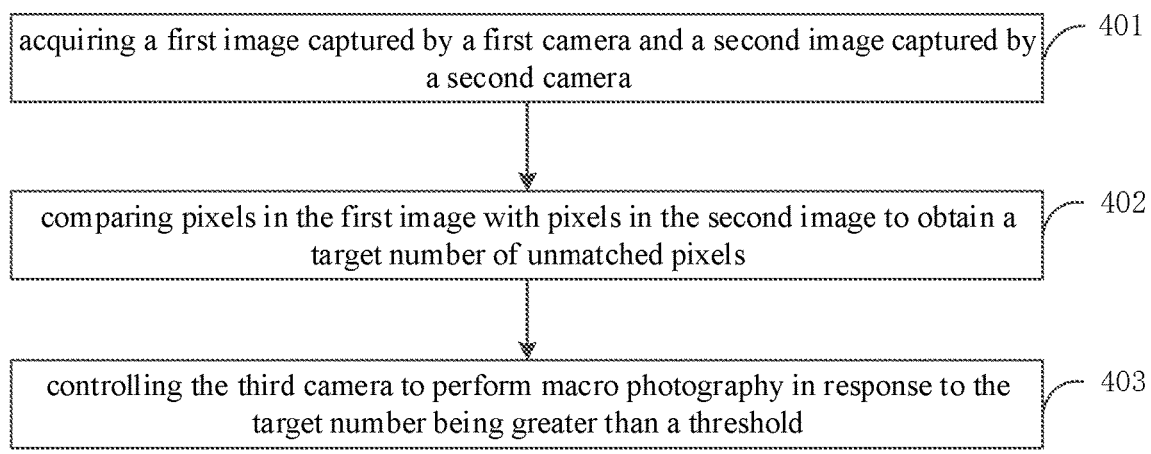
FIG. 4 is a flowchart illustrating another method for macro photography according to some embodiments of the disclosure.

In order to achieve the above embodiments, some embodiments provide another method for macro photography, indicating how to enable macro photography in response to determining that the photographed object belongs to the blind region of view. FIG. 4 is a flowchart illustrating another method for macro photography according to some embodiments of the disclosure. As illustrated in FIG. 4, the method includes the following.

At 401, a first image captured by a first camera and a second image captured by a second camera are acquired.

In an implementation of embodiments of the disclosure, the first camera and the second camera are arranged at intervals, and the third camera is located between the first camera and the second camera. FIG. 3 is a diagram illustrating positions of the first camera, the second camera and the third camera.

In another implementation of embodiments of the disclosure, the first camera and the second camera are launched in response to launching the third camera, and the first image captured by the first camera and the second image captured by the second camera are acquired. Therefore, it may be rapidly determined whether to enable the macro photography mode of the third camera.

In an implementation of embodiments of the disclosure, the first camera may be driven to collect the first image by a first pixel binning mode, and the second camera may be driven to collect the second image by a second pixel binning mode; in which the first pixel binning mode is acquiring by combining a set number of adjacent photosensitive pixels in an image sensor of the first camera, and the second pixel binning mode is acquiring by combining a set number of adjacent photosensitive pixels in an image sensor of the second camera, so that a plurality of adjacent pixels in the image sensor are combined as one pixel for output, which increases a light receiving region of a single pixel, and reduces an output resolution. The larger region of the single pixel, the better the imaging effect. Therefore, not only the imaging effect is improved but also the resolution when collecting the image is reduced by combining pixels, which facilitates to improve a subsequent processing speed when determining whether there is the overlapping region between the first image and the second image.

Pixel combination may be combining adjacent 4 photosensitive pixels in the image sensor, or combining adjacent 9 pixels in the image sensor, or combining adjacent 16 pixels in the image sensor, which is not limited in embodiments.

It needs to be noted that the foregoing explanation of the method embodiments at 101 is also applied to 401, which will not be repeated herein.

At 402, pixels in the first image are compared with pixels in the second image to obtain a target number of unmatched pixels.

According to some embodiments of the disclosure, a photographed object in the first image is recognized, and a photographed object in the second image is recognized. As an implementation, each pixel of the photographed object in the first image and each pixel of the photographed object in the second image may be recognized by a pre-trained neural network model.

Figure 5:
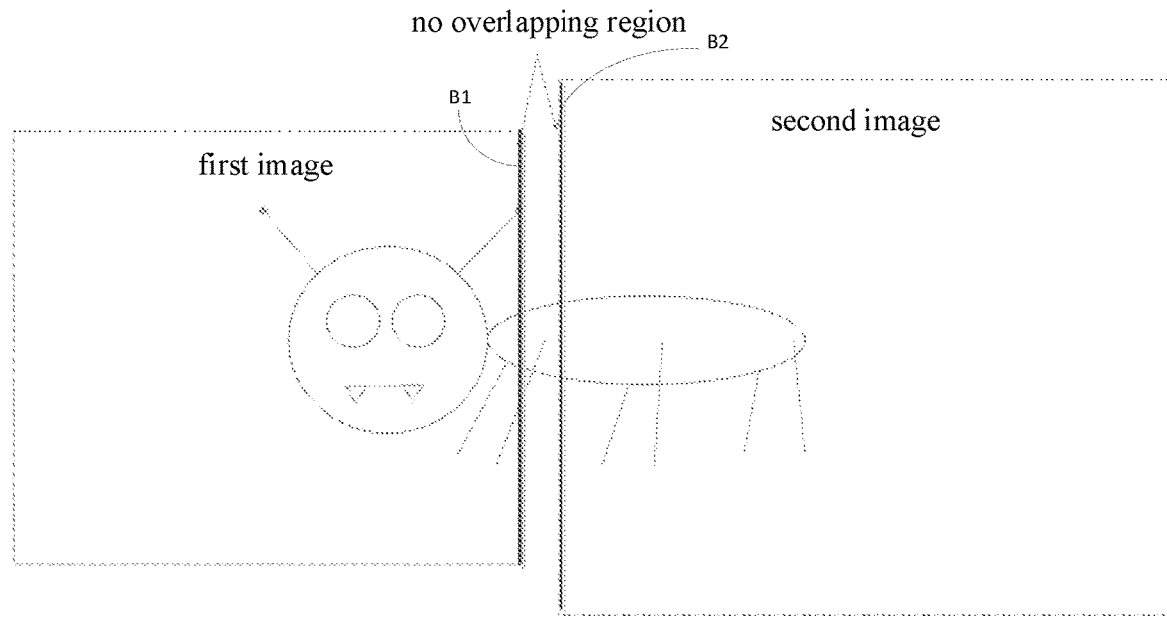
FIG. 5 is a diagram illustrating no overlapping region in images according to some embodiments of the disclosure.

Further, each pixel of the photographed object in the first image is compared with each pixel of the photographed object in the second image, to determine a target number of unmatched pixels in pixels of the photographed object in the first image and pixels of the photographed object in the second image based on features carried by each pixel. The obtained target number is compared with the threshold. The images corresponding to the photographed object in the first image and the photographed object in the second image are discontinuous, that is, the photographed object is in the blind region of view of the first camera and the second camera in response to the target number being greater than the threshold. In this case, the macro photography mode needs to be enabled and the third camera is controlled to perform macro photography. FIG. 5 is a diagram illustrating no overlapping region in images according to some embodiments of the disclosure. As illustrated in FIG. 5, the photographed object is an ant. There is no overlapping region between the first image and the second image, that is, the number of pixels matched between the features of pixels of the ant in the first image and the features of pixels of the ant in the second image is 0 and less than the set threshold. Therefore, there is no overlapping region between the first image and the second image.

According to some embodiments of the disclosure, in order to improve the efficiency of determining the target number of unmatched pixels, the following implementation may be adopted.

As a first implementation, a relative position relationship between the first camera and the second camera is obtained, and a first target edge of the first image is determined based on the relative position relationship. The relative position relationship between the first camera and the second camera may be horizontally arranged in the electronic device at intervals, or may be vertically arranged in the electronic device at intervals. The embodiments take the first camera and the second camera being horizontally arranged as an example. As illustrated in FIG. 2, the first camera and the second camera are horizontally arranged at intervals to obtain the first image and the second image as illustrated in FIG. 5. In this case, it is determined that the first target edge in the first image captured by the first camera is B1. Further, pixels on the first target edge are matched with the pixels in the second image to obtain the target number of unmatched pixels. As illustrated in FIG. 5, the pixels belonging to the photographed object on B1 are matched with all pixels belonging to the photographed object in the second image. According to some embodiments of the disclosure, by matching the pixels belonging to the photographed object on the edge in one image with all pixels belonging to the photographed object in the other image, the number of pixels for matching is reduced, and the matching efficiency of pixels is improved.

As a second implementation, in order to further improve the matching efficiency of pixels, a second target edge adjacent to the first target edge in the second image is determined based on the relative position relationship between the first camera and the second camera. Taking the first camera and the second camera are horizontally arranged at intervals as an example, as illustrated in FIG. 5, a second target edge B2 in the second image adjacent to the first target edge B1 is determined. Further, pixels on the first target edge are matched with pixels on the second target edge to obtain the target number of unmatched pixels.

Optionally, as an implementation, in a case of reducing the computation of matching and ensuring the matching accuracy, the number of pixels for matching in the two images may be enlarged, for example, in images of the adjacent portion in the first image and the second image, pixels of images in the set region are compared, for example, one quarter of images.

It should be noted that, the manner of determining the first target edge and the second target edge when the first camera and the second camera are vertically arranged at intervals is the same as the manner of determining the first target edge and the second target edge when the first camera and the second camera are horizontally arranged at intervals, which will not be repeated herein. As an implementation, pixels on the second target edge of the second image are matched with pixels in the first image to obtain the target number of unmatched pixels, with the same principle, which will not be repeated herein.

At block 403, the third camera is controlled to perform macro photography in response to the target number being greater than a threshold.

In an implementation of embodiments of the disclosure, the third camera is controlled to move to a second photography distance in response to the target number being greater than the threshold, that is, no overlapping region between the first image and the second image, in which, the second photography distance is less than or equal to the set macro photography distance. That is, the second photography distance is taken as an initial focusing distance of the third camera. The focusing distance of the third camera is adjusted based on the initial focusing distance to obtain a target focusing distance. For example, the macro photography distance is set to 8 cm, the second photography distance is set to 5 cm, and the focus search is performed starting from 5 cm to determine the target focusing distance of the clear image. The third camera is controlled to perform macro photography on the target focusing distance to obtain the clear macro photography image, which automatically enables the macro photography mode. At the same time, the third camera is directly controlled to move to the second photography distance and then fine-tuned for focus, which improves the macro photography speed.

In the method for macro photography according to some embodiments of the disclosure, the first image captured by the first camera and the second image captured by the second camera are acquired; and the third camera is controlled to perform macro photography in response to no overlapping region between the first image and the second image; in which there is the overlapping field between fields of view of the first camera and the second camera in response to photography distances of the first camera and the second camera being greater than or equal to the first photography distance, and the first photography distance is less than or equal to the macro photography distance set in the third camera. In the disclosure, when no overlapping region between the first image and the second image is recognized, it is determined that the photographed object is in the blind region of view between the first camera and the second camera. In this case, the macro photography mode of the third camera is automatically enabled, to improve the macro photography efficiency.

Figure 6:
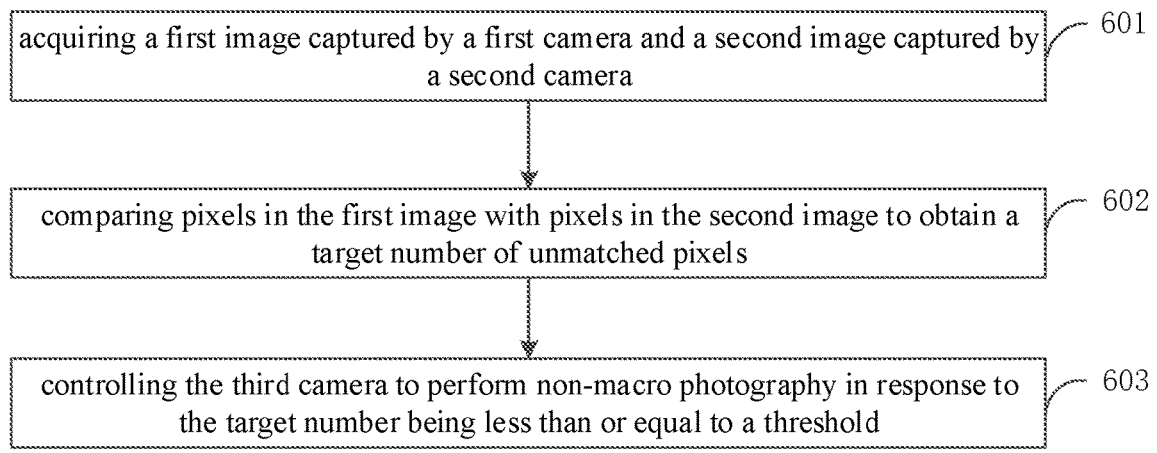
FIG. 6 is a flowchart illustrating another method for macro photography according to some embodiments of the disclosure.

In order to achieve the above embodiments, the embodiments provide another method for macro photography, indicating how to control the third camera for photography in response to determining that the photographed object does not belong to the blind region of view. FIG. 6 is a flowchart illustrating another method for macro photography according to some embodiments of the disclosure. As illustrated in FIG. 6, the method includes the following.

At 601, a first image captured by a first camera and a second image captured by a second camera are acquired.

At 602, pixels in the first image are compared with pixels in the second image to obtain a target number of unmatched pixels.

601 and 602 may refer to descriptions of the foregoing embodiments, with the same principle, which will not be repeated herein.

At 603, the third camera is controlled to perform non-macro photography in response to the target number being less than or equal to a threshold.

According to some embodiments of the disclosure, the third camera includes a macro photography capacity and a non-macro photography capacity. When the target number of unmatched pixels in the first image and the second image is less than or equal to the threshold, that is, there is the overlapping region between the first image and the second image, or the photographed object is not in the blind region of view of the first camera and the second camera but in an overlapping field between fields of view of the first camera and the second camera or in an overlapping field C between the first camera and the second camera in FIG. 2, the third camera is controlled to enable the non-macro photography mode to perform normal focus, to perform image collection for the photographed object, which satisfies the photography requirements in different scenes.

The related descriptions of the first camera, the second camera and the third camera may refer to descriptions of the foregoing embodiments, with the same principle, which will not be repeated herein.

In the method for macro photography according to some embodiments of the disclosure, the first image captured by the first camera and the second image captured by the second camera are acquired, and the third camera is controlled to perform non-macro photography, that is, perform normal photography, in response to the overlapping region between the first image and the second image, which rapidly recognizes whether to perform macro photography and satisfies the photography requirements in different scenes.

Based on the above embodiments, some embodiments further provide an implementation. Before the first image captured by the first camera and the second image captured by the second camera are acquired, the distance between the first camera and the second image is adjusted based on the macro photography distance required by the third camera, to satisfy the photography requirements in various scenes. In an implementation of embodiments of the disclosure, as illustrated in FIG. 3, the first camera, the second camera, and the third camera are arranged at intervals, the photography angle of the first camera and the photography angle of the second camera are known, and the set macro photography distance of the third camera is also acquired. Based on the Pythagorean theorem, if one side length and one angle are known, lengths of other two edges may be calculated, and further the camera distance may be calculated. Therefore, after the set macro photography distance of the third camera is adjusted in response to the user operation, the distance between the first camera and the second camera may be adjusted based on the adjusted set macro photography distance. A motor corresponding to the first camera or a motor corresponding to the second camera is controlled to move, so that the distance between the first camera and the second camera is adjusted, which satisfies the macro photography requirements in different scenes and improves the flexibility of macro photography.

In order to achieve the above embodiments, some embodiments of the disclosure further provide an apparatus for macro photography.

Figure 7:
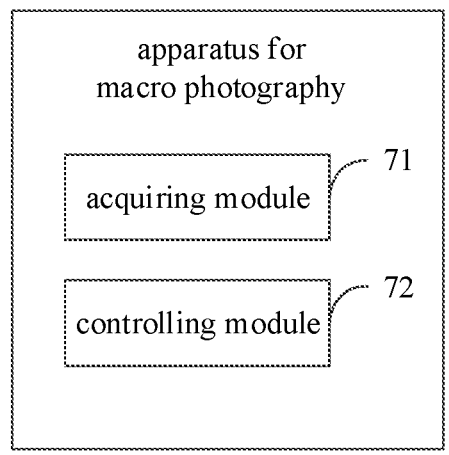
FIG. 7 is a block diagram illustrating an apparatus for macro photography according to some embodiments of the disclosure.

FIG. 7 is a block diagram illustrating an apparatus for macro photography according to some embodiments of the disclosure.

As illustrated in FIG. 7, the apparatus may include an acquiring module 71 and a controlling module 72.

The acquiring module 71 is configured to acquire a first image captured by a first camera and a second image captured by a second camera.

The controlling module 72 is configured to, control a third camera to perform macro in response to no overlapping region between the first image and the second image.

The third camera at least has a macro photography function, there is an overlapping field between fields of view of the first camera and the second camera in response to photography distances of the first camera and the second camera being greater than or equal to a first photography distance, and the first photography distance is less than or equal to a macro photography distance set in the third camera.

Optionally, in an implementation of embodiments of the disclosure, the acquiring module 71 is further configured to: launch the first camera and the second camera in response to launching the third camera; and acquire the first image captured by the first camera and the second image captured by the second camera.

In an implementation of embodiments of the disclosure, the third camera is provided with at least two photography focusing segments, and any of the at least two photography focusing segments correspond to a macro photography mode.

In an implementation of embodiments of the disclosure, the controlling module 72 may include a matching unit.

The matching unit is configured to match pixels in the first image with pixels in the second image to obtain a target number of unmatched pixels; and control the third camera to perform macro photography in response to the target number being greater than a threshold.

In a possible implementation of embodiments of the disclosure, the matching unit is further configured to: acquire a relative position relationship between the first camera and the second camera; determine a first target edge of the first image based on the relative position relationship; and match pixels on the first target edge with the pixels in the second image to obtain the target number of unmatched pixels.

In a possible implementation of embodiments of the disclosure, the matching unit is further configured to: determine a second target edge adjacent to the first target edge in the second image; and match the pixels on the first target edge with pixels on the second target edge to obtain the target number of unmatched pixels.

In an implementation of embodiments of the disclosure, the acquiring module 71 is further configured to: drive the first camera to collect the first image by a first pixel binning mode, and drive the second camera to collect the second image by a second pixel binning mode; the first pixel binning mode is acquiring by combining a set number of adjacent photosensitive pixels in an image sensor of the first camera, and the second pixel binning mode is acquiring by combining a set number of adjacent photosensitive pixels in an image sensor of the second camera.

In an implementation of embodiments of the disclosure, the controlling module 72 is further configured to: take a second photography distance as an initial focusing distance of the third camera, the second photography distance being less than or equal to the set macro photography distance; adjust a focusing distance of the third camera based on the initial focusing distance, to obtain a target focusing distance; and control the third camera to perform macro photography at the target focusing distance.

In an implementation of embodiments of the disclosure, the first camera and the second camera are arranged at intervals, and the third camera is located between the first camera and the second camera.

It needs to be noted that the foregoing explanation of the method embodiments is also applied to the apparatus in the embodiments, which will not be repeated herein.

In the apparatus for macro photography according to some embodiments of the disclosure, the first image captured by the first camera and the second image captured by the second camera are acquired; and the third camera is controlled to perform macro photography in response to no overlapping region between the first image and the second image; in which there is the overlapping field between fields of view of the first camera and the second camera in response to photography distances of the first camera and the second camera being greater than or equal to the first photography distance, and the first photography distance is less than or equal to the macro photography distance set in the third camera. In embodiments of the disclosure, when no overlapping region between the first image and the second image is recognized, it is determined that the photographed object is in the blind region of view between the first camera and the second camera. In this case, the macro photography mode of the third camera is automatically enabled, to improve the macro photography efficiency.

In order to achieve the embodiments, the disclosure further provides an electronic device. The electronic device includes a memory, a processor and computer programs stored on the memory and for running on the processor. The processor is configured to perform the method as described in the above method embodiments when performing the programs.

In order to achieve the embodiments, the disclosure further provides a non-transitory computer-readable storage medium stored with a computer program thereon, and when the program is performed by a processor, the method as described in the above method embodiments is performed.

In order to achieve the embodiments, the disclosure further provides a computer program product stored with a computer program thereon, and when the program is performed by a processor, the method as described in the above method embodiments is performed.

Figure 8:
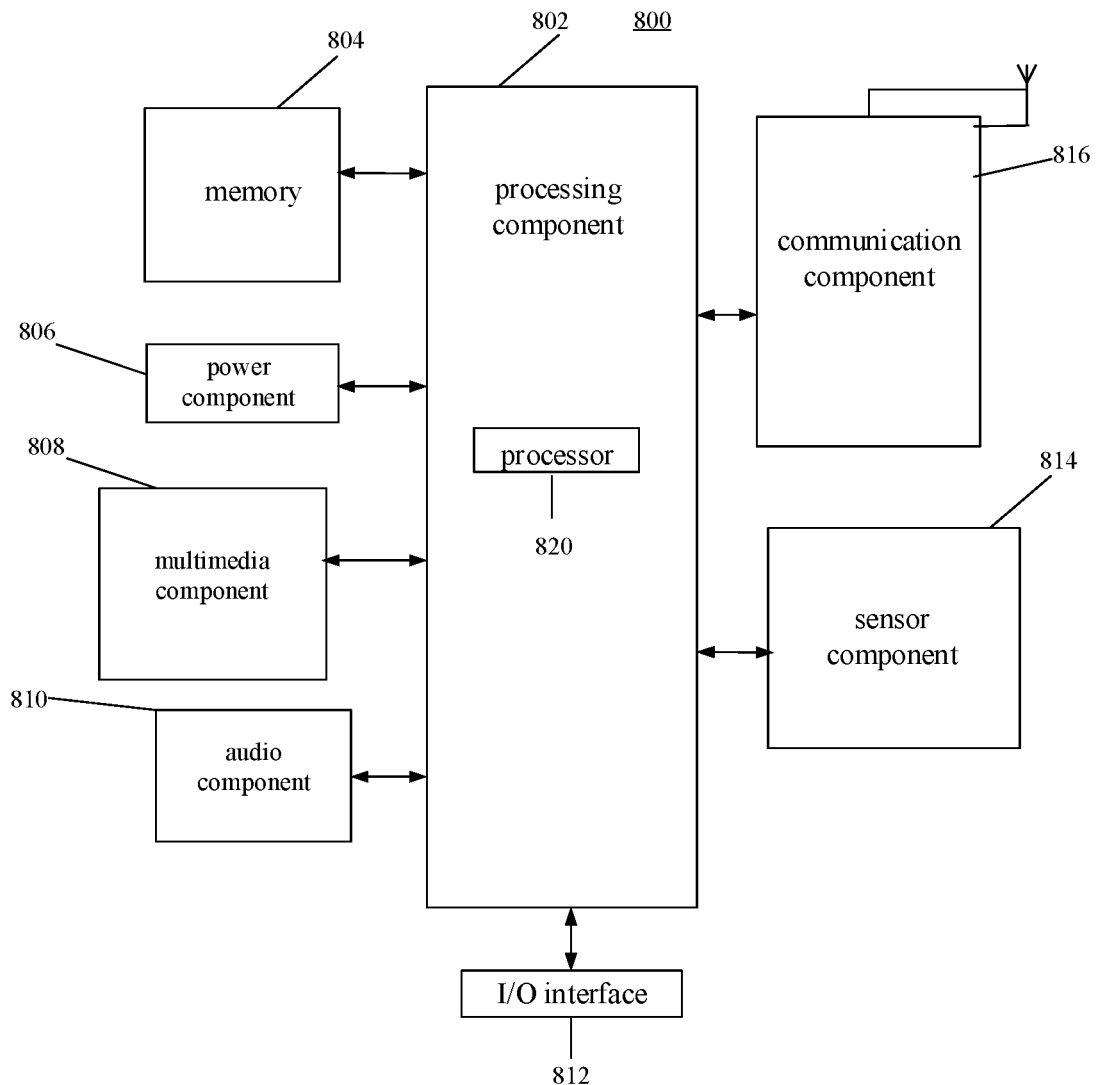
FIG. 8 is a block diagram illustrating an electronic device according to some embodiments of the disclosure.

FIG. 8 is a block diagram illustrating an electronic device according to some embodiments of the disclosure. For example, the device 800 may be a mobile phone, a computer, a digital broadcasting terminal, a messaging device, a game console, a tablet device, a medical equipment, a fitness equipment, a personal digital assistant or the like.

As illustrated in FIG. 8, the device 800 may include one or more of the following components: a processing component 802, a memory 804, a power component 806, a multimedia component 808, an audio component 810, an input/output (I/O) interface 812, a sensor component 814 and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the operations in the above described methods. Moreover, the processing component 802 may include one or more modules which facilitate the interaction between the processing component 802 and other components. The processing component 802 may include one or more processors 820 to execute instructions to perform all or part of the operations in the above described methods.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. When the apparatus 800 is in an operation mode, such as a shooting mode or a video mode, the front camera and/or the rear camera may receive external multimedia data. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as wireless fidelity (Wi-Fi), the fourth generation mobile communication technology (4G), or the fifth generation mobile communication technology (5G), or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

Reference throughout this specification to "an embodiment," "some embodiments," "example", "specific example" or "some examples" means that a particular feature, structure, material, or characteristic described in connection with the embodiment or example is included in at least one embodiment or example of the disclosure. Thus, the appearances of the above terms in various places throughout this specification are not necessarily referring to the same embodiment or example of the disclosure. Furthermore, embodiments or examples described in the specification, as well as features of embodiments or examples, may be combined without conflicting with each other.

In addition, the terms "first" and "second" are only for describing purposes and are not to be construed as indicating or implying relative importance or implicitly indicating the number of technical features indicated. Thus, features limiting "first" and "second" may explicitly or implicitly include at least one of the features. In the description of the disclosure, "a plurality of" means at least two, for example, two, three, unless otherwise expressly and specifically stated.

Any process or method described in a flow chart or described herein in other ways may be understood to include one or more modules, segments or portions of codes of executable instructions for achieving specific logical functions or steps in the process, and the scope of a preferred embodiment of the disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the disclosure may be achieved by commanding the related hardware with programs. The programs may be stored in a computer readable storage medium, and the programs comprise one or a combination of the steps in the method embodiments of the disclosure when run on a computer.

In addition, each function cell of the embodiments of the disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Even though embodiments of the disclosure have been illustrated and described above, it may be understood that the above embodiments are exemplary and may not be construed as a limitation of the disclosure, and changes, modifications, substitutions and alterations may be made to the above embodiments within the scope of the disclosure.

The invention claimed is:

1. A method for macro photography, comprising:
   acquiring a first image captured by a first camera and a second image captured by a second camera; and
   controlling a third camera to perform macro photography in response to no overlapping region between the first image and the second image;
   wherein, the third camera at least has a macro photography function, there is an overlapping field between fields of view of the first camera and the second camera in response to photography distances of the first camera and the second camera being greater than or equal to a first photography distance, and the first photography distance is less than or equal to a macro photography distance set in the third camera.

2. The method of claim 1, wherein, acquiring the first image captured by the first camera and the second image captured by the second camera, comprises:
   launching the first camera and the second camera in response to launching the third camera; and
   acquiring the first image captured by the first camera and the second image captured by the second camera.

3. The method of claim 1, wherein, the third camera is provided with at least two photography focusing segments, and any of the at least two photography focusing segments corresponds to a macro photography mode.

4. The method of claim 1, wherein, controlling the third camera to perform macro photography in response to no overlapping region between the first image and the second image, comprises:
   matching pixels in the first image with pixels in the second image to obtain a target number of unmatched pixels; and
   controlling the third camera to perform macro photography in response to the target number being greater than a threshold.

5. The method of claim 4, wherein, matching the pixels in the first image with the pixels in the second image to obtain the target number of unmatched pixels, comprises:
   acquiring a relative position relationship between the first camera and the second camera;
   determining a first target edge of the first image based on the relative position relationship; and
   matching pixels on the first target edge with the pixels in the second image to obtain the target number of unmatched pixels.

6. The method of claim 5, wherein, matching the pixels on the first target edge with the pixels in the second image to obtain the target number of unmatched pixels, comprises:
   determining a second target edge adjacent to the first target edge in the second image; and
   matching the pixels on the first target edge with pixels on the second target edge to obtain the target number of unmatched pixels.

7. The method of claim 1, wherein, acquiring the first image captured by the first camera and the second image captured by the second camera, comprises:
   driving the first camera to collect the first image by a first pixel binning mode, and driving the second camera to collect the second image by a second pixel binning mode;
   wherein, the first pixel binning mode is acquiring by combining a set number of adjacent photosensitive pixels in an image sensor of the first camera, and the second pixel binning mode is acquiring by combining a set number of adjacent photosensitive pixels in an image sensor of the second camera.

8. The method of claim 1, wherein, controlling the third camera to perform macro photography, comprises:
   taking a second photography distance as an initial focusing distance of the third camera, the second photography distance being less than or equal to the set macro photography distance;
   adjusting a focusing distance of the third camera based on the initial focusing distance, to obtain a target focusing distance; and
   controlling the third camera to perform macro photography at the target focusing distance.

9. The method of claim 1, wherein, the first camera and the second camera are arranged at intervals, and the third camera is located between the first camera and the second camera.

10. An electronic device, comprising:
    a first camera;
    a second camera;
    a third camera;
    a memory;
    a processor; and
    a computer program stored on the memory and for running on the processor,
    wherein the processor is configured to:
    acquire a first image captured by the first camera and a second image captured by the second camera; and
    control the third camera to perform macro photography in response to no overlapping region between the first image and the second image;
    wherein, the third camera at least has a macro photography function, there is an overlapping field between fields of view of the first camera and the second camera in response to photography distances of the first camera and the second camera being greater than or equal to a first photography distance, and the first photography distance is less than or equal to a macro photography distance set in the third camera.

11. The electronic device of claim 10, wherein, the processor is configured to:
    launch the first camera and the second camera in response to launching the third camera.

12. The electronic device of claim 10, wherein, the third camera is provided with at least two photography focusing segments, and any of the at least two photography focusing segments corresponds to a macro photography mode.

13. The electronic device of claim 10, wherein, the processor is configured to:
    match pixels in the first image with pixels in the second image to obtain a target number of unmatched pixels; and
    control the third camera to perform macro photography in response to the target number being greater than a threshold.

14. The electronic device of claim 13, wherein, the processor is configured to:
    acquire a relative position relationship between the first camera and the second camera;
    determine a first target edge of the first image based on the relative position relationship; and
    match pixels on the first target edge with the pixels in the second image to obtain the target number of unmatched pixels.

15. The electronic device of claim 14, wherein, the processor is configured to:
    determine a second target edge adjacent to the first target edge in the second image; and
    match the pixels on the first target edge with pixels on the second target edge to obtain the target number of unmatched pixels.

16. The electronic device of claim 10, wherein, the processor is configured to:
    drive the first camera to collect the first image by a first pixel binning mode, and drive the second camera to collect the second image by a second pixel binning mode;
    wherein, the first pixel binning mode is acquiring by combining a set number of adjacent photosensitive pixels in an image sensor of the first camera, and the second pixel binning mode is acquiring by combining a set number of adjacent photosensitive pixels in an image sensor of the second camera.

17. The electronic device of claim 10, wherein, the processor is configured to:
    take a second photography distance as an initial focusing distance of the third camera, the second photography distance being less than or equal to the set macro photography distance;
    adjust a focusing distance of the third camera based on the initial focusing distance, to obtain a target focusing distance; and
    control the third camera to perform macro photography at the target focusing distance.

18. The electronic device of claim 10, wherein, the first camera and the second camera are arranged at intervals, and the third camera is located between the first camera and the second camera.

19. A non-transitory computer-readable storage medium having stored therein instructions that, when executed by a processor of an electronic device including a first camera, a second camera and a third camera; causes the electronic device to perform a method for macro photography, the method comprising:
    acquiring a first image captured by the first camera and a second image captured by the second camera; and
    controlling the third camera to perform macro photography in response to no overlapping region between the first image and the second image;
    wherein, the third camera at least has a macro photography function, there is an overlapping field between fields of view of the first camera and the second camera in response to photography distances of the first camera and the second camera being greater than or equal to a first photography distance, and the first photography distance is less than or equal to a macro photography distance set in the third camera.

20. The non-transitory computer-readable storage medium of claim 19, wherein acquiring the first image captured by the first camera and the second image captured by the second camera, comprises:
    launching the first camera and the second camera in response to launching the third camera; and
    acquiring the first image captured by the first camera and the second image captured by the second camera.

\* \* \* \* \*